US012654716B2

(12) United States Patent
Raichelgauz et al.

(10) Patent No.: US 12,654,716 B2
(45) Date of Patent: Jun. 16, 2026

(54) TRAINING OF MACHINE LEARNING PROCESSES FOR AUTONOMOUS DRIVING APPLICATIONS

(71) Applicant: AUTOBRAINS TECHNOLOGIES LTD., Tel Aviv-Jaffa (IL)

(72) Inventors: Igal Raichelgauz, Tel Aviv-Jaffa (IL); Tomer Cohen, Tel Aviv-Jaffa (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 143 days.

(21) Appl. No.: 18/625,826

(22) Filed: Apr. 3, 2024

(65) Prior Publication Data
US 2025/0313216 A1 Oct. 9, 2025

(51) Int. Cl.
B60W 50/00 (2006.01)
B60W 60/00 (2020.01)

(52) U.S. Cl.
CPC ............ B60W 50/00 (2013.01); B60W 60/00 (2020.02); B60W 2050/0075 (2013.01)

(58) Field of Classification Search
None
See application file for complete search history.

(56) References Cited

U.S. PATENT DOCUMENTS

| | | | | |
|---|---|---|---|---|
| 12,142,082 B1 * | 11/2024 | Raichelgauz | .......... | G06V 40/33 |
| 2013/0163884 A1 * | 6/2013 | Shechtman | ........ | G06V 10/7515 |
| | | | | 382/203 |
| 2020/0209882 A1 * | 7/2020 | Kashi | ................... | G10K 11/178 |
| 2021/0200229 A1 * | 7/2021 | Refaat | ............... | B60W 60/0027 |
| 2025/0148351 A1 * | 5/2025 | Garcia | ................... | G06N 20/00 |
| 2025/0245974 A1 * | 7/2025 | Gugale | ................ | G06V 10/764 |

* cited by examiner

*Primary Examiner* — Peter D Nolan
*Assistant Examiner* — Jacob Kent Besteman-Street
(74) *Attorney, Agent, or Firm* — RECHES PATENTS

(57) ABSTRACT

A method for training of machine learning processes, the method includes (a) obtaining, at a first computerized process, an identified signature, the identified signature identified at a second computerized process based on an overlap between a first top matching of signatures that are untagged and randomly obtained and a second top matching of signatures that are untagged and are correctly or erroneously indicative of a detection of a reference classification; and (b) training, by the first computerized process, a machine learning process using a training dataset of signatures and further based on the identified signature, to provide determinations for the reference classification with respect to an automated driving application.

20 Claims, 6 Drawing Sheets receiving, by a processing circuit, a signature associated with an identification of an element. 410

Matching the signature to a group of first signatures that are untagged and are randomly obtained. 420

Matching the signature to a group of second signatures that are untagged and are correctly or erroneously indicative of a detection of reference elements 440

Identifying first top matching signatures 430

Identifying second top matching signatures 450

Determining an overlap between the first top matching signatures to the second top matching signatures 460

Overlap < threshold | Comparing the overlap to a threshold 471 | Overlap > threshold Determining that the signature is faulty 472

Determining that the signature is non-faulty 473

Determining whether the signature is faulty or not-faulty based on the overlap 470

Responding 480

400

Computerized system 300

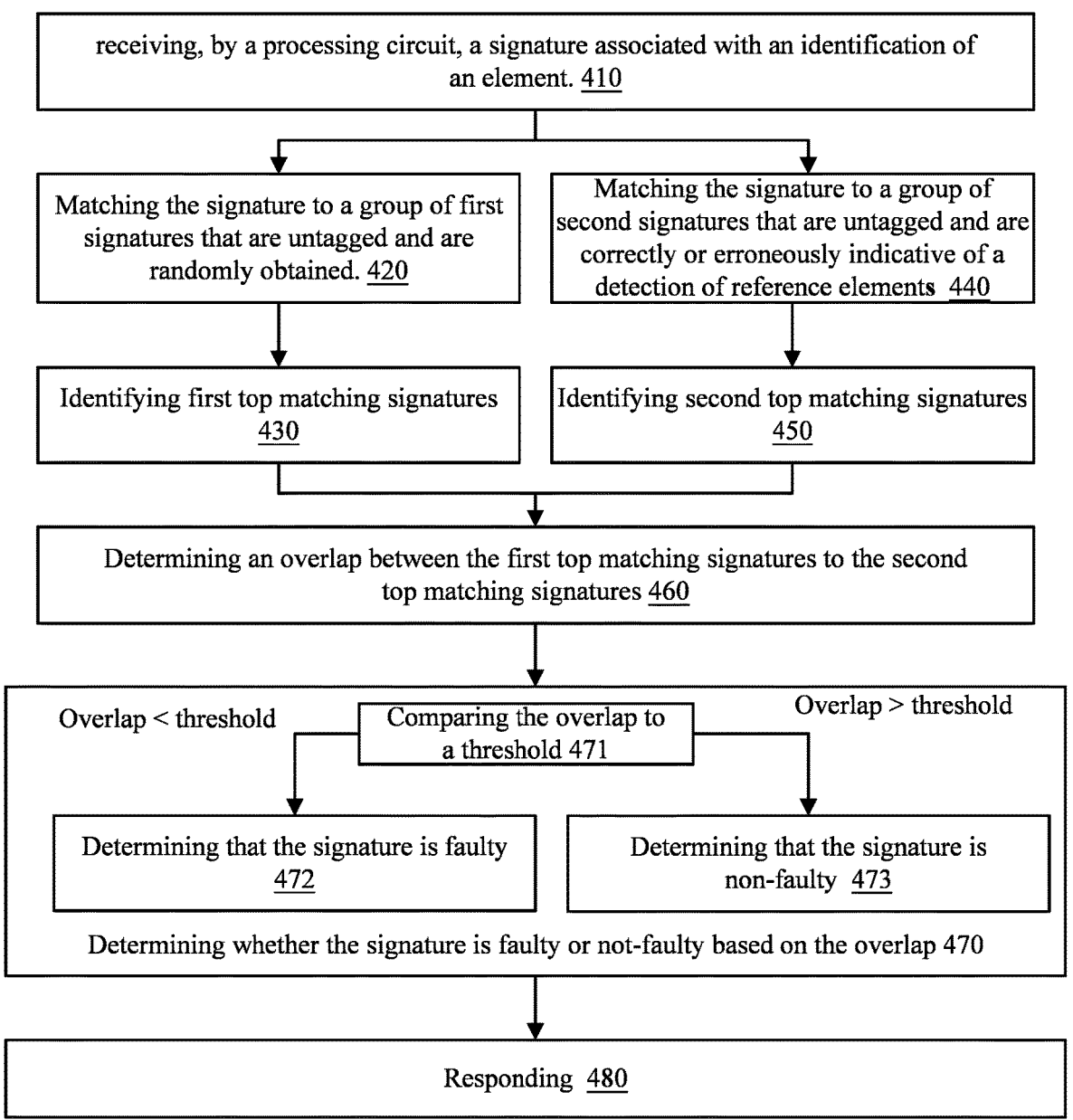

receiving, by a processing circuit, a signature associated with an identification of an element. 410

Matching the signature to a group of first signatures that are untagged and are randomly obtained. 420

Matching the signature to a group of second signatures that are untagged and are correctly or erroneously indicative of a detection of reference elements 440

Identifying first top matching signatures 430

Identifying second top matching signatures 450

Determining an overlap between the first top matching signatures to the second top matching signatures 460

Overlap < threshold     Comparing the overlap to a threshold 471     Overlap > threshold Determining that the signature is faulty 472

Determining that the signature is non-faulty 473

Determining whether the signature is faulty or not-faulty based on the overlap 470

Responding 480

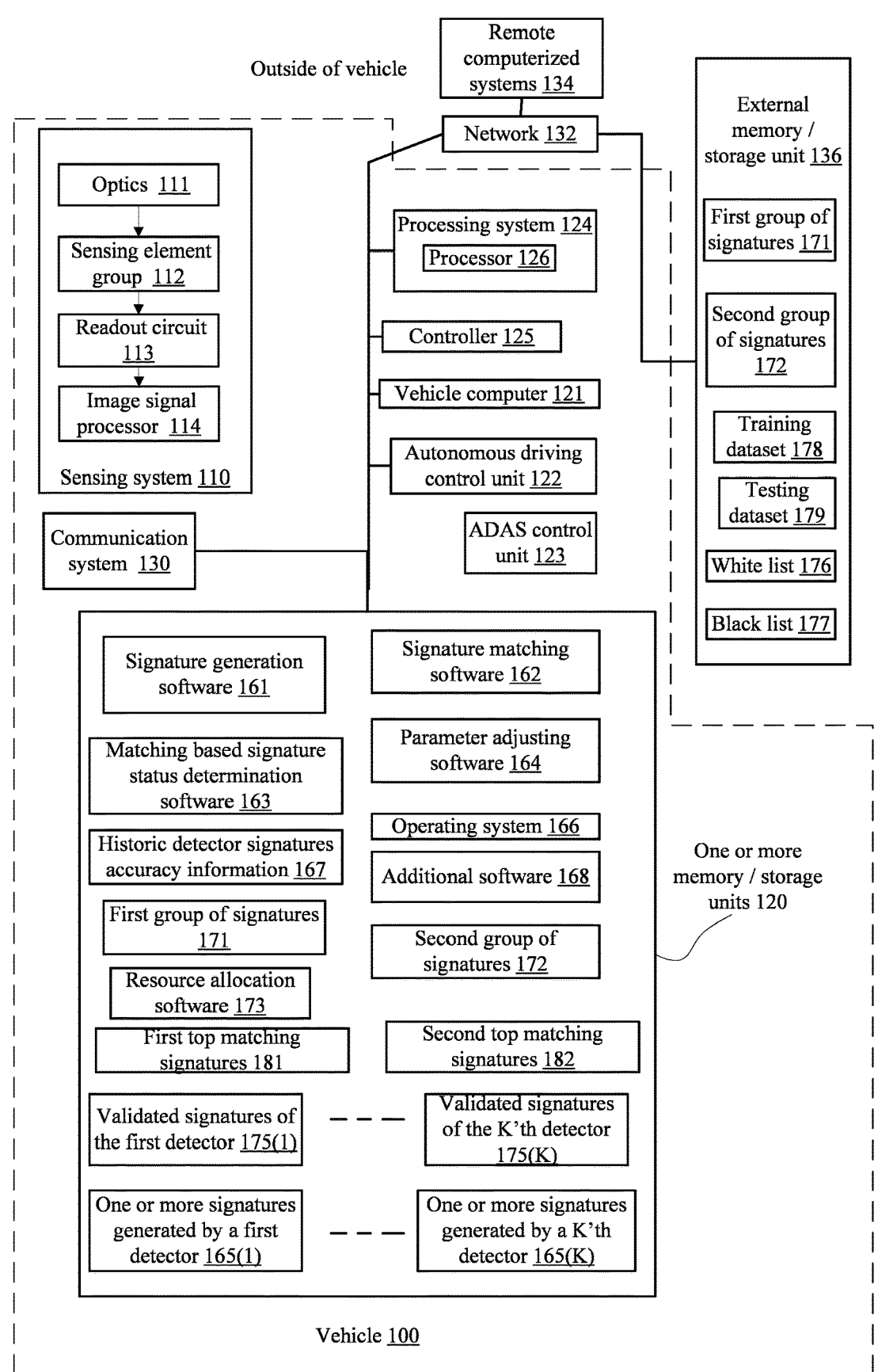

Outside of vehicle

Remote computerized systems 134

Network 132

Optics 111

Sensing element group 112

Readout circuit 113

Image signal processor 114

Sensing system 110

Processing system 124
Processor 126

Controller 125

Vehicle computer 121

Autonomous driving control unit 122

ADAS control unit 123

External memory / storage unit 136

First group of signatures 171

Second group of signatures 172

Training dataset 178

Testing dataset 179

White list 176

Black list 177

Communication system 130

Signature generation software 161

Signature matching software 162

Matching based signature status determination software 163

Parameter adjusting software 164

Historic detector signatures accuracy information 167

Operating system 166

Additional software 168

First group of signatures 171

Second group of signatures 172

Resource allocation software 173

First top matching signatures 181

Second top matching signatures 182

Validated signatures of the first detector 175(1)

Validated signatures of the K'th detector 175(K)

One or more signatures generated by a first detector 165(1)

One or more signatures generated by a K'th detector 165(K)

One or more memory / storage units 120

Vehicle 100

FIG. 2C

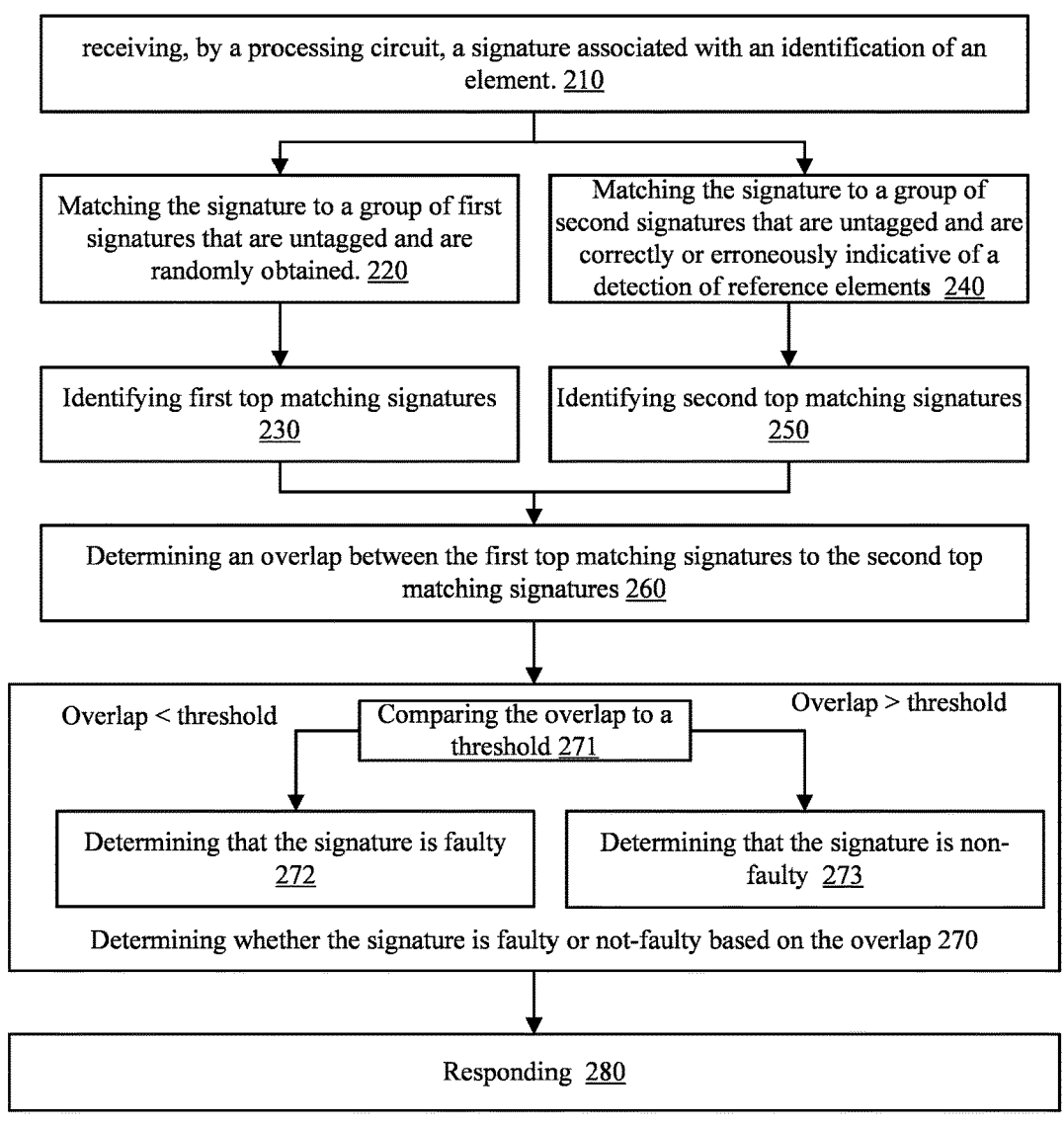

receiving, by a processing circuit, a signature associated with an identification of an element. 210

Matching the signature to a group of first signatures that are untagged and are randomly obtained. 220

Matching the signature to a group of second signatures that are untagged and are correctly or erroneously indicative of a detection of reference elements 240

Identifying first top matching signatures 230

Identifying second top matching signatures 250

Determining an overlap between the first top matching signatures to the second top matching signatures 260

Overlap < threshold          Comparing the overlap to a threshold 271          Overlap > threshold Determining that the signature is faulty 272

Determining that the signature is non-faulty 273

Determining whether the signature is faulty or not-faulty based on the overlap 270

Responding 280

Automatically adjusting one or more parameters 290

Determining a value of the threshold based on a dynamically set tradeoff between false positive detections and true positive detections 292

Determining a value of the threshold based on a dynamically determined accuracy metric of a signature generator that generated the signature 294

Dynamically determining a number of the first signatures of the first top matching signatures 296

Dynamically adjusting a signature generator that generated the signature based on an outcome of step 280. 298

TRAINING OF MACHINE LEARNING PROCESSES FOR AUTONOMOUS DRIVING APPLICATIONS

FIELD OF DISCLOSURE

The present disclosure relates to the field of machine learning, and more particularly, to a method, non-transitory computer-readable storage medium, and computer-implemented system for training of machine learning processes for autonomous driving.

BACKGROUND

A perception system is a key building block of all modern advanced driving assistance system (ADAS) and autonomous vehicle (AV) solutions. The system is responsible for detection, tracking and measurement of driving related entities, such as road users, lanes, traffic signs and traffic lights. The output of the perception system is a 3D environmental model, which is used as a basis for every decision making and path planning of the automated vehicle.

All the modern perception systems are based on state-of-the-art deep-learning technology.

The deep learning models can be trained using supervised or unsupervised training.

Supervised training may be more reliable than unsupervised training but is more costly and heavily depends on accurate tagging of training sets.

Therefore, there is a growing need to train deep learning modules in an efficient, cost-effective manner.

SUMMARY

The present disclosure provides a method, non-transitory computer-readable storage medium and computer-implemented system for training a neural network model as well as visualizing a latent representation of a neural network model.

In a first aspect of the present disclosure, A method for training of machine learning processes is provided. The method includes obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

In another aspect of the present disclosure, A non-transitory computer readable medium is provided. The non-transitory computer readable medium stores instructions that, when executed by a processor, cause the processor to perform operations for training of machine learning processes, including: obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

In yet another aspect of the present disclosure, a system for training of machine learning processes is provided. The system, includes a processing circuitry, and a memory, the memory containing instructions that, when executed by the processing circuitry, configure the system to: obtain, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and train, by the first computerized process, a machine learning process using a training dataset of signatures, and based on the identified signature, to provide determinations for the reference classification with respect to an automated driving application.

BRIEF DESCRIPTION OF THE DRAWINGS

The embodiments of the disclosure will be understood and appreciated more fully from the following detailed description, taken in conjunction with the drawings in which:

FIG. 1B illustrates a flow chart of an example of a method, according to an embodiment of the present disclosure;

FIG. 2C illustrates a block diagram of an example of a vehicle system for a vehicle, according to an embodiment of the present disclosure; and FIG. 3 illustrates a flowchart of an example of a method, according to an embodiment of the present disclosure.

DESCRIPTION OF EXAMPLE EMBODIMENTS

There is provided a method, a non-transitory computer readable medium and a system for automatically identifying faulty signatures for autonomous driving applications.

Examples of autonomous driving applications includes ADAS applications, autonomous driving applications, and the like.

The different figures illustrates examples of units and/or software and/or information items and/or steps and/or components. These examples are provided for brevity of explanation. At least one of the units and/or software and/or information items and/or steps and/or components is optional or mandatory.

There is provided a computer implemented method and a non-transitory computer readable medium that uses signatures identified as faulty or not faulty (i.e., faultless)—where the identification process is cost effective, does not require manual tagging and is reliable even when the signatures are not associated with a define class. The identification of the signatures as faulty or not is reliable—which increases the reliability of the training.

Figure 1A:
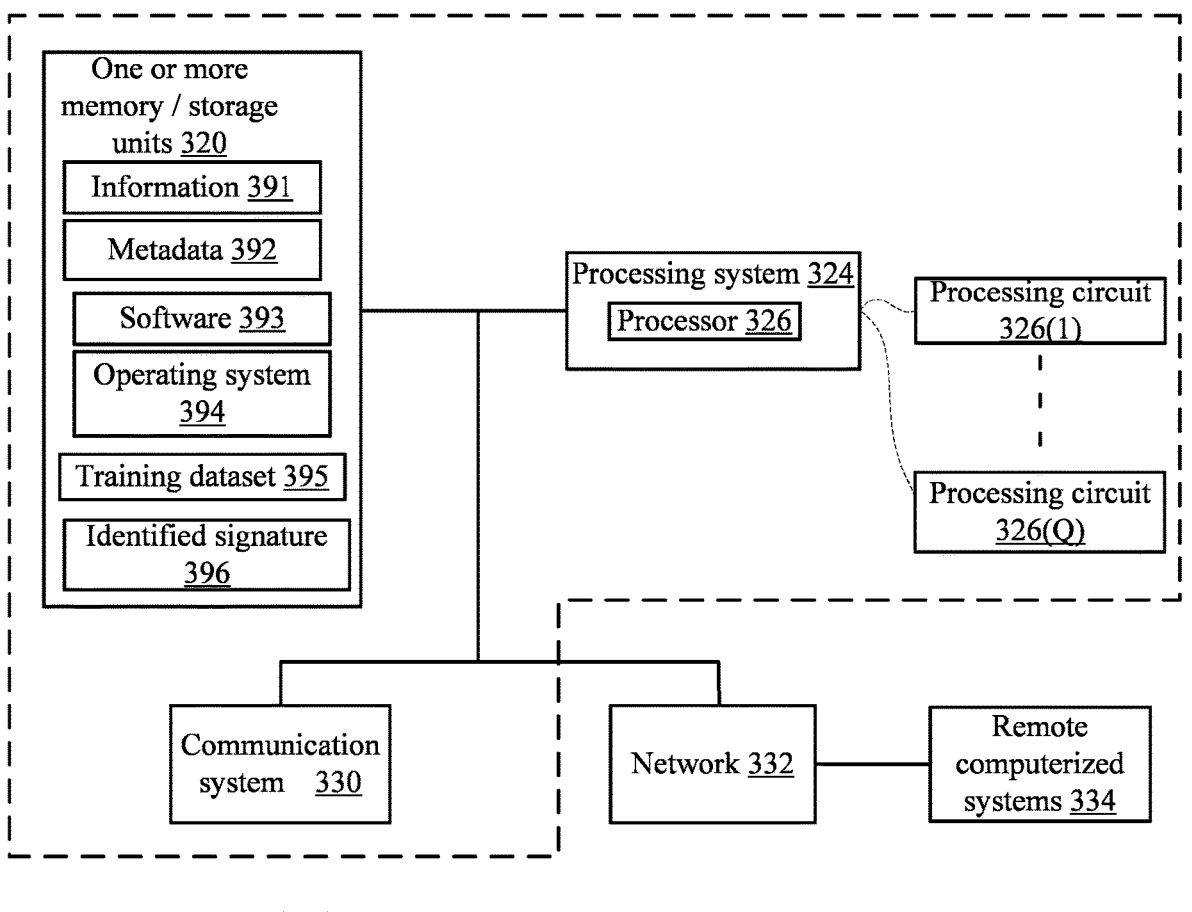
FIG. 1A illustrates a block diagram of an example of a computerized system, according to an embodiment of the present disclosure.

FIG. 1A illustrates a block diagram of an example of a computerized system 300, according to an embodiment of the present disclosure.

According to embodiment, the computerized system 300 is selected out of at least one of a vehicle computerized system, an out of vehicle computerized system, a computerized system that has one part within a vehicle and another part outside of a vehicle, a cloud based computerized system, a distributed computerized system, a centralized computerized system, a server, a laptop, a desktop, a mobile computerized system, a stationary computerized system, and the like.

Computerized system 300 includes a communication system 330, one or more memory and/or storage units 320, network 332 in communication within one or more remote computerized systems 334, and a processing system 324 that includes a processor 326 having a plurality (Q) of processing circuits 326(1)-326(Q).

Figure 2A:
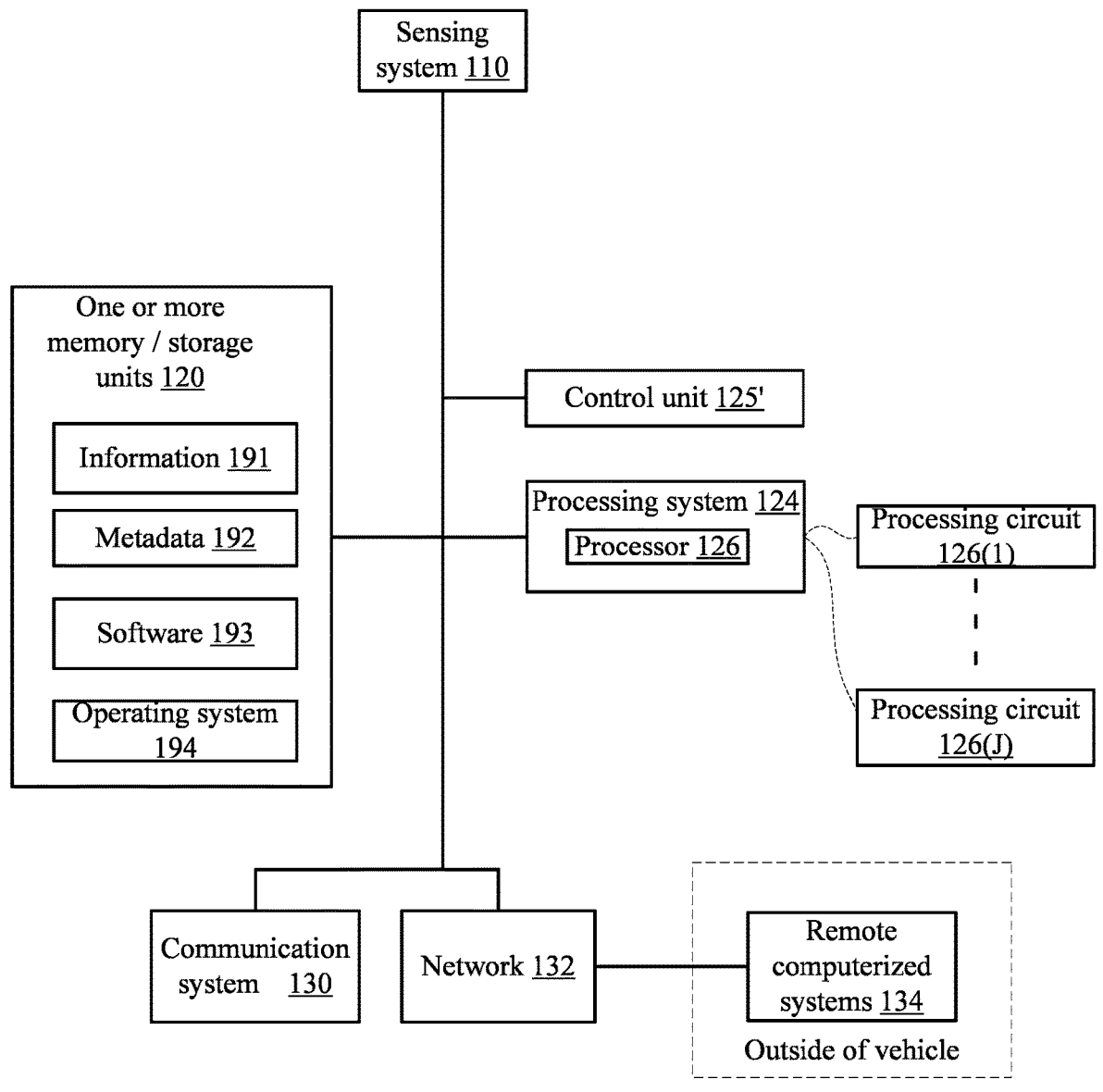
FIG. 2A illustrates a block diagram of an example of a vehicle system for a vehicle, according to an embodiment of the present disclosure.
Figure 2B:
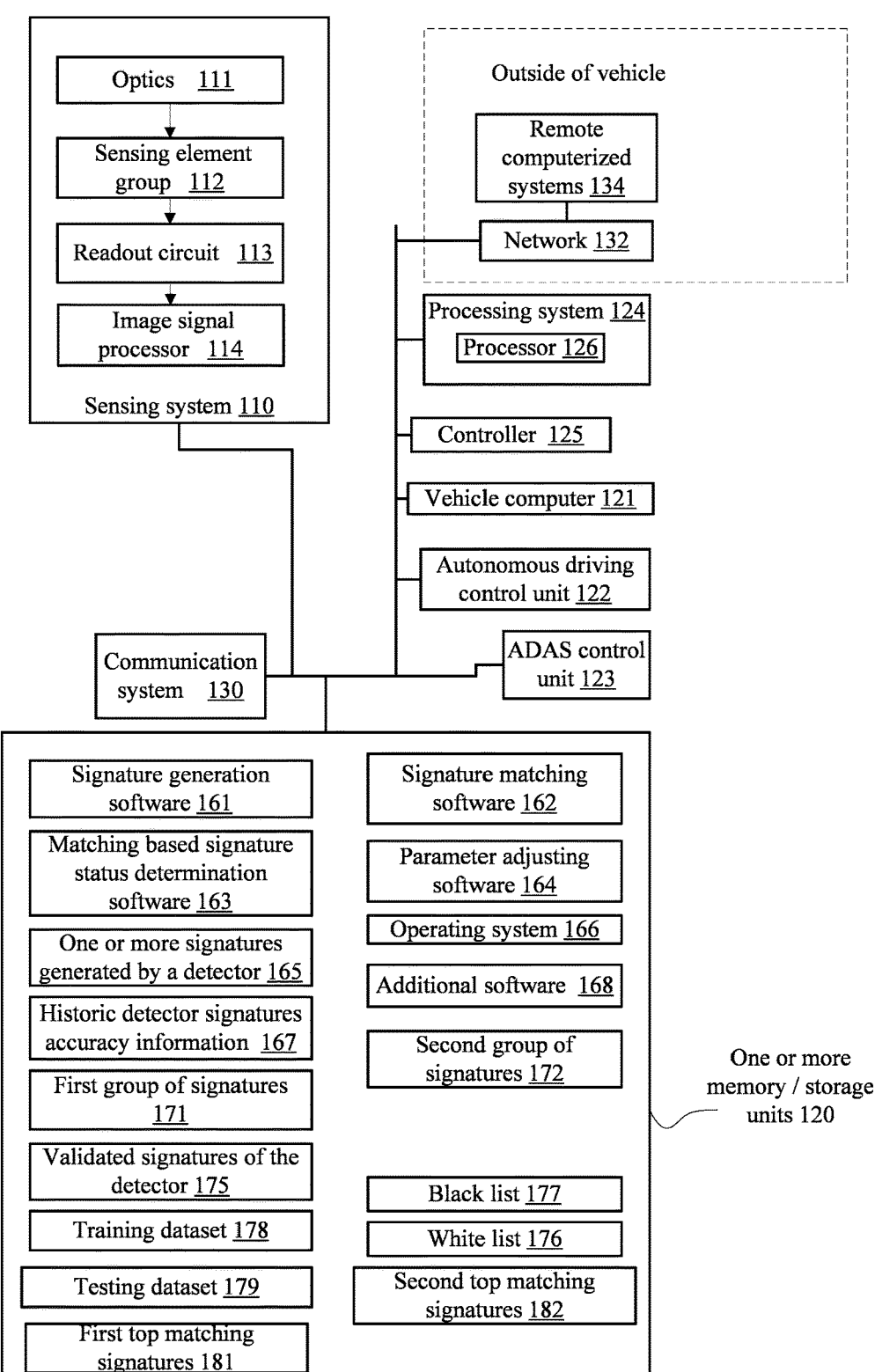
FIG. 2B illustrates a block diagram of an example of a vehicle system for a vehicle, according to an embodiment of the present disclosure.

An example of one of the remote computerized systems 334 is the computerized system illustrated as block diagrams in FIG. 2A, 2B or AC, and includes processing system 124 and one or more memory/storage units 120.

The communication system 330 is configured to enable communication between the one or more memory and/or storage units 320 and/or the sensing system 310 and/or any one of the additional units and/or the network 332 (that is in communication with the remote computerized systems).

The one or more memory and/or storage units 320 are configured to store firmware and/or software (such as training software 393), one or more operating systems (such as operating system 394), information 391 and metadata 392 required to the execution of one or more of the methods mentioned in this application—for example method 400. Examples of information and/or metadata includes identified signature 396 and training dataset 395. It should be noted that there may be multiple identified signatures and/or multiple training datasets, and/or testing datasets, and the like.

The memory and/or storage units 320 was shown as storing software. Any reference to software should be applied mutatis mutandis to code and/or firmware and/or instructions and/or commands, and the like.

Any reference to one unit or item should be applied mutatis mutandis to multiple units or items. For example— any reference to processor should be applied mutatis mutandis to multiple processors, any reference to communication system 330 should be applied mutatis mutandis to multiple communication systems.

According to an embodiment, the one or more memory and/or storage units 320 includes one or more memory unit, each memory unit may include one or more memory banks.

According to an embodiment, the one or more memory and/or storage units 320 includes a volatile memory and/or a non-volatile memory. The one or more memory and/or storage units 320 may be a random access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory unit.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. Communication elements other than communication system 330 may be provided.

The communication system 330 may include a bus. The represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 332 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 330) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 320 may be stored outside the vehicle. It should also be noted that the processor may evaluate signatures generated by a plurality of detectors.

FIG. 1B illustrates a flow chart of an example of a method 400, according to an embodiment of the present disclosure.

According to an embodiment, method 400 includes step 410 of obtaining, at a first computerized process, an identified signature, the identified signature identified at a second computerized process based on an overlap between a first top matching of signatures that are untagged and randomly obtained and a second top matching of signatures that are untagged and are correctly or erroneously indicative of a detection of a reference classification.

According to an embodiment the identified signature is identified as being faulty or non-faulty (i.e., faultless).

According to an embodiment the identified signature is also identified as being associated with a reference classification. Examples of a reference classification may include a vehicle, a vehicle of a certain type, a vehicle of a certain type and a certain model, a pedestrian, a traffic sign, a certain object, a scene, and the like.

According to an embodiment, the association with a reference classifications means that the element represented by the signature is of a known class.

According to an embodiment, the association with a reference classifications means that the element represented by the signature is of an unknown class.

According to an embodiment, the identified signature is generated by executing method 200 of FIG. 3.

According to an embodiment, step 410 is followed by step 420 of training, by the first computerized process, a machine learning process using a training dataset of signatures and further based on the identified signature, to provide determinations for the reference classification with respect to an automated driving application.

According to an embodiment, step 410 includes receiving the identified signature from the second process.

According to an embodiment, the training dataset includes the identified signature.

According to an embodiment, the identified signature represents a sensed information unit. A sensed information unit may be sensed by any type of sensors—such as a visual light camera, an infrared sensor, a radar, an ultrasonic sensor, and electro-optics sensor, a radiography sensor, a LIDAR (light detection and ranging), a passive sensor, an active sensor, and the like.

According to an embodiment the training dataset includes the sensed information unit. The sensed information unit may be included in the dataset, in addition to the identified signature. Alternatively—the sensed information unit may be included in the dataset, instead of the identified signature.

According to an embodiment, step 420 includes applying any training process. For example—a training that includes back-propagation, a training that includes calculating a loss value, reinforcement learning, a combination of supervised learning and unsupervised learning, and the like. In an embodiment, this may involve matching the signature to a group of first signatures that are untagged and randomly obtained.

FIGS. 2A, 2B and 2 illustrate block diagram examples of a vehicle 100, a network 132 and remote computerized systems 134.

In FIG. 2A the vehicle 100 is illustrated as including sensing system 110, a communication system 130, one or more memory and/or storage units 120, control unit 125′, network 132 in communication with remote computerized systems 134.

An example of one of the remote computerized systems 134 is the computerized system 300 illustrated in FIG. 1A.

The one or more memory and/or storage units 120 is illustrated as storing information 191, metadata 192, software 193 and operating system 194. The information 191, metadata 192, software 193 and operating system 194 are required for executing one or more methods illustrated in the specification—such as method 200.

Processor 126 of FIG. 2A is illustrated as including a plurality of processing units 126(1)-126(J), J is an integer that exceeds one.

In FIGS. 2B and 2C the control unit 125′ is replaced by different components such as advanced driver assistance system (ADAS) control unit 123, autonomous driving control unit 122, vehicle computer 121, and controller 125. It is noted that only some of these components may be included in the vehicles.

FIGS. 2B and 2C also provides examples of one or more types of information 191 and metadata 192 and/or software 193 stored in the one or more memory and/or storage units 120.

Communication system 130, one or more memory and/or storage units 120, and processing system 124 may form a computerized system. The computerized system may include one or more other systems and/or units such as sensing system 110 (at least the image signal processor 114), the ADAS control unit 123, the autonomous driving control unit 122, the vehicle computer 121, and the controller 125.

The sensing system 110 includes optics 111, sensing element group 112, a readout circuit 113, and an image signal processor 114. Optics 111 are followed by a sensing element group such as line of sensing elements or an array of sensing elements that form the sensing element group 112. The sensing element group 112 is followed by a readout circuit 113 that reads detection signals generated by the sensing element group 112. An image signal processor 114 is configured to perform an initial processing of the detection signals—for example by improving the quality of the detection information, performing noise reduction, and the like. The sensing system 110 is configured to output one or more sensed information units (SIUs).

The communication system 130 is configured to enable communication between the one or more memory and/or storage units 120 and/or the sensing system 110 and/or any one of the additional units and/or the network 132 (that is in communication with the remote computerized systems).

The controller 125 is configured to control the operation of the sensing system 110, and/or the one or more memory and/or storage units 120 and/or the one or more additional units (except the controller).

The ADAS control unit 123 is configured to control ADAS operations.

The autonomous driving control unit 122 is configured to control autonomous driving of the autonomous vehicle.

The vehicle computer 121 is configured to control the operation of the vehicle—especially controlling the engine, the transmission, and any other vehicle system or component.

The processing system 124 may include processor 126 and one or more other processors and is configured to execute any method illustrated in the specification.

The one or more memory and/or storage units 120 are configured to store firmware and/or software, one or more operating systems, data and metadata required to the execution of any of the methods mentioned in this application.

FIG. 2B illustrates the one or more memory and/or storage units 120 as storing:

First group of signatures 171.

Second group of signatures 172.

First top matching signatures 181. This may include the most matching signatures—for example the top 1, 2, 3, 4, 5, 6, 7, 8, 9, 10, 12, 15, 20, 25, 30 or any other number of the most matching signatures. According to an embodiment, a match is determined based on a distance between the (evaluated) signature and signatures of the first group of signatures. Any distance may be calculated. According to an embodiment, a signature includes indexes for data retrieval and the match includes an exact match.

Second top matching signatures 182. This may include the most matching signatures—for example the top 1, 2, 3, 4, 5, 6, 7, 8, 9, 10, 12, 15, 20, 25, 30 or any other number of the most matching signatures.

Signature generation software 161 configured to generate a signature. The signature may be generated based on the SIU but may be generated based on other information. A detector may be provided when the processing system 124 executes the signature generation software. Examples of a signature and signature generators that are examples of detectors are illustrated in U.S. patent application Ser. No. 17/309,064 publication serial number 2022/0041184 which is incorporated herein by reference.

Signature matching software 162 configured to (a) match the signature to signatures of the first group of signatures 171 to provide the first top matching signatures 181, and to (b) match signature to signatures of the second group of signatures 172 to provide the second top matching signatures 182.

Matching based signature status determination software 163 configured to determined whether the signature is faulty or non-faulty based on an overlap between the first top matching signatures 181 and the second top matching signatures 182. The overlap may be signatures that are included in both the first and second top matching signatures.

Parameter adjusting software 164 configured to adjust any parameter related to the determination of whether the signature is OK or faulty.

One or more signatures generated by a detector 165. The one or more signatures include signatures that may be evaluated to determine whether they are OK or faulty.

Operating system 166.

Historic detector signatures accuracy information 167 indicative of an accuracy (reflected by having OK or faulty signatures) of the detector. This history information may provide an indication of whether the detector increases its accuracy, maintains its accuracy, or decreases its accuracy over time. The parameter adjustment software may use such information.

Additional software 168 that may be used to perform any other functionality of the vehicle and/or of any of the other units illustrated in FIG. 2B.

Validated signatures of the detector 175—includes signatures of the detector that were tested to be OK or faulty.

A white list 176 of signatures generated by the detector that are presumed to be OK (non-faulty).

A black list 177 of signatures generated by the detector that are presumed to be faulty.

A training dataset 178 used for training a machine learning process. It may be updated by adding signatures that were found to be OK—and these signatures may be flagged as OK. It may also be updated by adding signatures as being faulty—which are also flagged as faulty.

A testing dataset 179 used for testing a machine learning process. It may be updated by adding signatures that were found to be OK—and these signatures may be flagged as OK. It may also be updated by adding signatures as being faulty—which are also flagged as faulty.

The vehicle computer 121 may be in communication with an engine control module, a transmission control module, a powertrain control module, and the like The memory and/or storage units 120 was shown as storing software. Any reference to software should be applied mutatis mutandis to code and/or firmware and/or instructions and/or commands, and the like.

Any reference to one unit or item should be applied mutatis mutandis to multiple units or items. For example— any reference to processor should be applied mutatis mutandis to multiple processors, any reference to communication system 130 should be applied mutatis mutandis to multiple communication systems.

According to an embodiment, the one or more memory and/or storage units 120 includes one or more memory unit, each memory unit may include one or more memory banks.

According to an embodiment, the one or more memory and/or storage units 120 includes a volatile memory and/or a non-volatile memory. The one or more memory and/or storage units 120 may be a random access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory unit.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. Communication elements other than communication system 130 may be provided.

FIGS. 2A, 2B and 2C illustrate communication system 130 as being in communication with various processors and/or units and network 132.

The communication system 130 may include a bus. The represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus, and all buses specified in this description can also be implemented over a wired or wireless network connection and each of the subsystems.

Network 132 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 130) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 120 may be stored outside the vehicle. It should also be noted that the processor may evaluate signatures generated by a plurality of detectors.

FIG. 2C illustrates an example of a vehicle 100, network 132, remote computerized systems 134, and also illustrates an external memory/storage unit 136.

FIG. 2C differs from FIG. 2B by illustrating an external memory/storage unit 136 that stores the first group of signatures 171, the second group of signatures 172, the training dataset 178, the testing dataset 179, the white list 176 and the black list 177. In contrary to FIG. 2B—the training dataset 178, the testing dataset 179, the white list 176 and the black list 177 are not stored in the one or more memory/storage units 120.

FIG. 2C also differs from FIG. 2B by illustrating the one or more memory/storage units 120 as storing validated signatures from a plurality (K) of detectors—from the validated signatures of the first detector 175(1) till the validated signatures of the K'th detector 175(K).

FIG. 2C further differs from FIG. 2B by illustrating the one or more memory/storage units 120 as storing one or more signatures from the plurality (K) of detectors—from the signatures of the first detector 165(1) till the signatures of the K'th detector 165(K).

FIG. 3 illustrates an example of method 200 that is computer implemented and is for automatically identifying faulty signatures for autonomous driving applications.

According to an embodiment, method 200 includes step 210 of receiving, by a processing circuit, a signature associated with an identification of an element, the element is at least one of an object or a road scenario. Accordingly—the signature may be associated with an identification or an object. Alternatively—the signature may be associated with an identification of a scenario.

A scenario may be, for example, at least one of (a) a location of the vehicle, (b) one or more weather conditions, (c) one or more contextual parameters, (d) a road condition, (e) a traffic parameter.

Various examples of a road condition may include the roughness of the road, the maintenance level of the road, presence of potholes or other related road obstacles, whether the road is slippery, covered with snow or other particles.

Various examples of a traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. A contextual parameter may be related to the context of the sensed information-context may be depending on or relating to the circumstances that form the setting for an event, statement, or idea.

Examples of situations and of a situation based processing are illustrated in U.S. patent application Ser. No. 16/035,732 which is incorporated herein by reference.

According to an embodiment, step 210 includes accessing a memory unit or a buffer that stores signatures generated by the detector.

According to an embodiment, step 210 is followed by steps 220 and 240.

According to an embodiment, step 220 includes matching the signature to a group of first signatures that are untagged and may be obtained in any manner—for example may be randomly obtained—or in any manner that is made without knowing the content represented by the signatures and/or any manner that is made regardless of the content (which may be unknown) represented by the signatures.

According to an embodiment, step 220 is followed by step 230 of identifying, based on the matching of step 220, first top matching signatures.

According to an embodiment, step 240 includes matching the signature to a group of second signatures that are untagged and are correctly or erroneously indicative of a detection of reference elements. For example—a second signature was determined (correctly or erroneously) by the detector to identify a certain reference element. A second signature that was correctly indicative of a detection of a reference element may be a true positive signature or a true negative signature. A second signature was incorrectly indicative of a detection of a reference element may be a false positive signature or a false negative signature.

According to an embodiment, step 240 is followed by step 250 of identifying, based on the matching of step 240 second top matching signatures.

According to an embodiment, steps 230 and 250 are followed by step 260 of determining an overlap between the first top matching signatures to the second top matching signatures.

According to an embodiment, an overlapping signature may appear in both the first and second top matching signatures.

According to an embodiment, an overlapping signature may appear in the first top matching signatures and a close enough signature (within a defined distance) appears in the second top matching signatures.

According to an embodiment, step 260 is followed by step 270 of determining whether the signature is faulty or not-faulty based on the overlap.

According to an embodiment, step 270 includes step 271, step 272, and step 273.

According to an embodiment step 271 includes comparing the overlap to a threshold. The threshold value may be dynamically updated—for example may range between 1 to 99 percent or between any subrange that is a part of the range of 1 to 99 percent (for example 5, 15, 20, 30, 35, 40, 45, 50, 55, 60, 65, 70, 75, 80, 85, 90, 95 percent and the like) or any value that equals N1/N2 whereas N1 and N2 are positive numbers whereas N1 is smaller than N2.

According to an embodiment, step 272 includes determining that the signature is faulty when the overlap is below the threshold.

According to an embodiment, step 273 includes determining that the signature is non-faulty when the overlap is above the threshold.

According to an embodiment, when the overlap equals the threshold—the classification of the signature as faulty or not is determined by a defined rule.

According to an embodiment, step 270 is followed by step 280 of responding to the outcome of step 270.

According to an embodiment, the responding may include at least one of:

Generating a signature status indication—indicating whether the signature was faulty or not faulty.

Storing the signature status indicator in a memory unit and/or storage unit.

Transmitting over a communication link or channel the signature status indication.

Tagging the signature as faulty or non-faulty.

Sensing feedback to a signature generator that generate the signature received in step 210.

Triggering or requesting or instructing a removal of the signature from a white list—when found faulty.

Triggering or requesting or instructing an insertion of the signature to a white list—when found non-faulty.

Triggering or requesting or instructing an addition of the signature to a black list—when found faulty.

Triggering or requesting or instructing a removal of the signature from a black list—when found faulty.

Triggering or requesting or instructing an execution of step 290.

Triggering an inclusion of the signature in a training dataset used to train a machine learning process. The signature may be added with its status (faulty or unfaulty) or may be added based on its status.

Triggering a deletion of the signature from a training dataset used to train a machine learning process. The signature may be removed based on its status (faulty or non-faulty).

Triggering an inclusion of the signature in a testing dataset used to test a machine learning process. The signature may be added with its status (faulty or unfaulty) or may be added based on its status.

Triggering a deletion of the signature from a testing dataset used to test a machine learning process. The signature may be removed based on its status (faulty or non-faulty).

Triggering or requesting or instructing an initiation of provision of another detector to be allocated to generating the signature.

Triggering or requesting or instructing an evaluation of the detector that generated the signature.

Triggering or requesting or instructing an evaluation of a sensing unit that generated a sensed information unit that was processed to provide the signature.

Triggering or requesting or instructing a re-configuration of a sensing unit that generated a sensed information unit that was processed to provide the signature.

Triggering or requesting or instructing an determination of a scenario that was supposed to be represented, at least in part, by the signature.

Triggering or requesting or instructing to evaluate a compatibility of the sensing unit to sense the scenario.

Triggering or requesting or instructing to evaluate a compatibility of the signature generator to generate signatures related to the scenario.

Triggering or requesting or instructing an initiation of provision of another detector to be allocated to generate signatures related to the scenario.

Monitoring outcomes of multiple iterations of steps 210-270, and sending feedback, based on the monitoring, to a signature generator that generated the signature.

Tagging the signature, based on the outcome of step 270.

According to an embodiment, method 200 includes step 290 of automatically adjusting one or more parameters of method 200.

According to an embodiment, step 290 is automatically adjusted per defined period and/or based on events and/or outcomes of the execution of steps 210-280.

For example—step 290 may be triggered when finding a change in the accuracy of the signatures generated by the detector.

If, for example, the percent of faulty signatures generated by the detector decreases over time—the adjustment can be made under the assumption that the detector is more reliable. Step 290 may include increasing the threshold, reducing the frequency of execution of method 200, calculating the updated false positive and the updated true negative (of the signatures evaluated by method 200) and updating the tradeoff between the false positive detections and the true positive detections.

A change in the accuracy that mandates a triggering of step 290 may be defined in various manners—for example having a rule that defines the minimal number of outcome of step 270 that merits the triggering. Yet for another example—the change may be above a minimal value—for example a change of 0.001 may not merit the triggering of step 290. A hysteresis may be applied in order to reduce too frequent changes of any of the parameters.

According to an embodiment, step 292 includes determining a value of the threshold based on a dynamically set tradeoff between false positive detections and true positive detections.

According to an embodiment, step 294 includes determining a value of the threshold based on a dynamically determined accuracy metric of a signature generator that generated the signature.

According to an embodiment, step 296 includes dynamically determining a number of the first signatures of the first top matching signatures.

According to an embodiment, step 298 includes dynamically adjusting a signature generator that generated the signature based on an outcome of step 280.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the perception unit, narrow AI agents, driving decision unit may be implemented in hardware and/or code, instructions and/or commands stored in a non-transitory computer readable medium, may be included in a vehicle, outside a vehicle, in a mobile device, in a server, and the like.

The vehicle may be any type of vehicle such as a ground transportation vehicle, an airborne vehicle, or a water vessel.

The specification and/or drawings may refer to sensed information unit (SIU). The SIU may be an image, a media unit and the like. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor. An SIU may be any arrangement of sensed information— may be of any size and/or format—for example an image, one or more image, an audio packet, a chunk of sensed information, and the like.

Any reference to a SIU should be applied, mutatis mutandis to a processed SIU. A processed SIU may be generated by processing an SIU, processing a previously processed SIU, and the like. The processing may include any operation—such as—filtering, noise reduction, SIU manipulation, padding, and the like.

Any reference to a cluster should be applied mutatis mutandis to a cluster structure. A concept structure may include one or more clusters. Each cluster may include signatures and related metadata.

Any reference to obtaining a content may include receiving the content, generating the content, participating in a processing of the content, processing only a part of the content and/or receiving only another part of the content. Examples of content include one or more signatures, an SIU and the like.

The obtaining of the content include object detection or may be executed without performing object detection.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

A situation may be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

An erroneous signature is a signatures that once used may introduce an error related to object detection. According to an embodiment, the erroneous signature is an ambiguous signature that when used for the object detection, results in inconsistent detection of objects. According to an embodiment, the erroneous signature when used for the object detection, results in at least one of (i) a false negative detection or (ii) a false positive detection. Any reference to an ambiguous signature should be applied mutatis mutandis to any other erroneous signature. Any reference to a false positive signature should be applied mutatis mutandis to any other erroneous signature. Any reference to a false negative signature should be applied mutatis mutandis to any other erroneous signature.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the systems depicted herein are merely exemplary, and that in fact many other system s may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of system s or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by people skilled in the art that the embodiments of the disclosure are not limited by what has been particularly shown and described hereinabove. Rather the scope of the embodiments of the disclosure is defined by the appended claims and equivalents thereof.

Further Embodiments are listed below.

Embodiment 1. A method for training of machine learning processes, the method includes: obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

Embodiment 2. The method according to Embodiment 1, wherein the obtaining further includes receiving the identified signature from the second computerized process.

Embodiment 3. The method according to Embodiments 1 and 2, wherein the identified signature is determined at the second computerized process in association with the reference classification.

Embodiment 4. The method according to Embodiments 1-3, wherein the training dataset of signatures includes the identified signature.

Embodiment 5. The method according to Embodiments 1-4, wherein the identified signature represents a sensed information unit.

Embodiment 6. The method according to Embodiments 1-5, wherein the training dataset of signatures comprises the sensed information unit.

Embodiment 7. The method according to Embodiments 1-6, wherein the identified signature is identified, by the second computerized process, as being faultless.

Embodiment 8. The method according to Embodiments 1-7, wherein the identified signature is identified, by the second computerized process, as being faulty.

Embodiment 9. A non-transitory computer readable medium storing instructions that, when executed by a processor, cause the processor to perform operations for training of machine learning processes, including: obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

Embodiment 10. The non-transitory computer readable medium according to Embodiment 9, wherein the obtaining further includes receiving the identified signature from the second computerized process.

Embodiment 11. The non-transitory computer readable medium according to Embodiments 9 and 10, wherein the identified signature is determined at the second computerized process in association with the reference classification.

Embodiment 12. The non-transitory computer readable medium according to Embodiments 9-11, wherein the training dataset of signatures includes the identified signature.

Embodiment 13. The non-transitory computer readable medium according to Embodiments 9-12, wherein the identified signature represents a sensed information unit.

Embodiment 14. The non-transitory computer readable medium according to Embodiments 9-13, wherein the training dataset of signatures includes the sensed information unit.

Embodiment 15. The non-transitory computer readable medium according to Embodiments 9-14, wherein the identified signatures is identified, by the second computerized process, as being faultless.

Embodiment 16. The non-transitory computer readable medium according to Embodiments 9-15, wherein the identified signatures is identified, by the second computerized process, as being faulty.

Embodiment 17. A system for training of machine learning processes, including: a processing circuitry; and a memory, the memory containing instructions that, when executed by the processing circuitry, configure the system to: obtain, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and train, by the first computerized process, a machine learning process using a training dataset of signatures, and based on the identified signature, to provide determinations for the reference classification with respect to an automated driving application.

Embodiment 18. The system according to Embodiment 17, wherein the obtaining further includes receiving the identified signature from the second computerized process.

Embodiment 19. The system according to Embodiments 17 and 18, wherein the identified signature is determined at the second computerized process in association with the reference classification.

Embodiment 20. The system according to Embodiments 17-19, wherein the training dataset of signatures includes the identified signature.

We claim:

1. A method for training of machine learning processes, the method comprises:

obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

2. The method according to claim 1, wherein the obtaining further comprises receiving the identified signature from the second computerized process.

3. The method according to claim 1, wherein the identified signature is determined at the second computerized process in association with the reference classification.

4. The method according to claim 1, wherein the training dataset of signatures includes the identified signature.

5. The method according to claim 1, wherein the identified signature represents a sensed information unit.

6. The method according to claim 5, wherein the training dataset of signatures comprises the sensed information unit.

7. The method according to claim 1, wherein the identified signature is identified, by the second computerized process, as being faultless.

8. The method according to claim 1, wherein the identified signature is identified, by the second computerized process, as being faulty.

9. A non-transitory computer readable medium storing instructions that, when executed by a processor, cause the processor to perform operations for training of machine learning processes, comprising:

obtaining, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and training, by the first computerized process, a machine learning process using a training dataset of signatures, and based on the identified signature, to provide determinations for the reference classification with respect to an automated driving application.

10. The non-transitory computer readable medium according to claim 9, wherein the obtaining further comprises receiving the identified signature from the second computerized process.

11. The non-transitory computer readable medium according to claim 9, wherein the identified signature is determined at the second computerized process in association with the reference classification.

12. The non-transitory computer readable medium according to claim 9, wherein the training dataset of signatures includes the identified signature.

13. The non-transitory computer readable medium according to claim 9, wherein the identified signature represents a sensed information unit.

14. The non-transitory computer readable medium according to claim 13, wherein the training dataset of signatures comprises the sensed information unit.

15. The non-transitory computer readable medium according to claim 9, wherein the identified signatures is identified, by the second computerized process, as being faultless.

16. The non-transitory computer readable medium according to claim 9, wherein the identified signatures is identified, by the second computerized process, as being faulty.

17. A system for training of machine learning processes, comprising a processing circuitry; and a memory, the memory containing instructions that, when executed by the processing circuitry, configure the system to:

obtain, at a first computerized process, an identified signature, the identified signature identified at a second computerized process based on an overlap between a first top matching of signatures that are untagged and randomly obtained, and a second top matching of signatures that are untagged and are correctly or erroneously indicative of a detection of a reference classification; and train, by the first computerized process, a machine learning process using a training dataset of signatures, and based on the identified signature, to provide determinations for the reference classification with respect to an automated driving application.

18. The system according to claim 17, wherein the obtaining further comprises receiving the identified signature from the second computerized process.

19. The system according to claim 17, wherein the identified signature is determined at the second computerized process in association with the reference classification.

20. The system according to claim 17, wherein the training dataset of signatures includes the identified signature.

* * * * *